Patented Sept. 4, 1928.

1,682,919

UNITED STATES PATENT OFFICE.

ALEXANDER T. MAXIMOFF, OF NEW YORK, N. Y., ASSIGNOR TO THE NAUGATUCK CHEMICAL COMPANY, OF NAUGATUCK, CONNECTICUT, A CORPORATION OF CONNECTICUT.

MANUFACTURE OF ERYTHRENE.

No Drawing.    Application filed September 18, 1926.    Serial No. 136,386.

This invention relates to an improved method of manufacturing erythrene from aldol. According to previously known methods, erythrene has been made from this material by a difficult process involving first a reduction of the aldol by means of an electric current, the reduction being carried out in an acid medium. The product, 1–3 butylene glycol, is then transformed into erythrene by passage over heated aluminum hydroxide as a catalyst. In the present invention, this involved synthesis is avoided, and the improved method herein described is at the same time much simpler, more economical, and considerably more productive.

In one embodiment, the invention comprises passing a mixture of aldol, alcohol and water through a heated furnace containing a catalyst at elevated temperatures, collecting the gaseous reaction products, converting the erythrene into separable form, separating this from the other reaction products and recovering erythrene therefrom. Although a specific illustration is given below, it is to be understood that the invention is not limited in its scope, except as may be required by the prior art.

As one illustration, a mixture containing 30% by volume of aldol, 60% by volume of ethyl alcohol and 10% by volume of water is passed through a furnace, such as an electrically heated tube, containing precipitated aluminum hydroxide in lump form. The furnace is preferably maintained at about 300°, and a suitable rate of flow of the mixture is 5 cc. per minute. The heat serves to convert the aldol into erythrene, although other products may be formed at the same time.

The vaporous products are cooled to room temperature, dried and again cooled to a low temperature, say—80° C. by the use of a refrigerating mixture such as acetone and solid carbon dioxide. As a more specific illustration, 390 cc. of the above described mixture are passed through the heated tube over the catalyst at the rate of 5 cc. per minute. The gaseous products are cooled, dried, and passed into bromine. The yield of bromides will be about 318 grams, of which 96 grams or about 30% is solid material. This solid material may be filtered out or recovered in any desired way and purified by washing with petroleum ether. A melting point determination on the purified solid bromide recrystallized from alcohol gives 115° C., which is the melting point of erythrene tetrabromide. The amount of erythrene tetrabromide in this particular illustration represents a 17.5% yield calculated upon the amount of aldol originally employed. The tetra bromide may be converted into erythrene by heating with zinc dust in an alcoholic medium.

The proportion of aldol to alcohol may be equimolecular, but larger proportions of alcohol may be employed. Good results may be obtained with one molecular proportion of aldol to two of alcohol. The amount of water present in the mixture may also be increased or decreased. The efficiency of the reaction may be augmented by recovery of the alcohol and of any unchanged aldol in the reaction product. The presence of the water serves to keep the catalyst clean during the passage of the mixture, and it also minimizes resinification of the aldol. The alcohol acts as a diluent and it may have other functions, for the reaction appears to be somewhat complicated in the nature of the intermediate products formed. Nevertheless the yields obtainable by this improved method may reach as high as 20% to 25% as compared with a maximum of 14% obtained in the preparation of erythrene from acetaldehyde and alcohol. As ordinarily carried out, this latter process seldom gives yields higher than 9% to 11%.

Instead of aldol, it is possible to employ other aliphatic aldehydes having at least four carbon atoms. Crotonaldehyde, which can be made from aldol, is one illustration.

While in the above illustration the temperature has been given as 300° C., the reaction may be carried out as low as 250° and as high as 460° C. approximately, but it is desirable to carry out the process at temperatures lying in the lower part of this range. The furnace or reaction tube need not be of any particular design, but for convenience an electrically heated tube may be employed. Instead of condensing the reaction products by cooling them to low temperatures, the products may be liquefied by compression.

The conversion of the erythrene bromide into erythrene may be accomplished in any suitable manner, and other reagents may be employed instead of the bromide although this gives a product which is easy to handle. For large scale operations, however, it will be more desirable to employ condensation and fractional distillation for separating the erythrene, instead of the treatment with bromine.

It will thus be seen that the present invention furnishes a simple, inexpensive and highly efficient method for preparing erythrene from aldol, the process being free from any of the cumbersome and involved steps hitherto employed. The reaction mixture is passed through the tube containing a dehydration catalyst and the vapors are collected condensed or compressed, after which the erythrene may be recovered by fractional distillation or by chemical treatment, either of which yields the erythrene in a separable form. The improved process is therefore direct, and the desired product is obtained in one reaction, without the use of expensive apparatus.

Having thus described my invention, what I desire to claim and protect by Letters Patent is:

1. Method of manufacturing erythrene which comprises pyrogenically decomposing an aliphatic aldehyde having at least four carbon atoms at temperatures below 500° C. to produce a mixture of erythrene and other products, and recovering the erythrene therefrom.

2. Method of manufacturing erythrene which comprises subjecting an aliphatic aldehyde having at least four carbon atoms to temperatures below 500° C. and at ordinary pressure in the presence of a dehydration catalyst to produce a mixture of erythrene and other products, and recovering the erythrene therefrom.

3. Method of manufacturing erythrene which comprises subjecting an aliphatic aldehyde having at least four carbon atoms to temperatures between 250° C.–460° C. in the presence of a catalyst to produce a mixture of erythrene and other products, and recovering the erythrene therefrom.

4. Method of manufacturing erythrene which comprises decomposing a mixture of alcohol and an aliphatic aldehyde having at least four carbon atoms at temperatures below 500° C. and at atmospheric pressure to produce a mixture of erythrene and other products, and recovering the erythrene from the mixture.

5. Method of manufacturing erythrene which comprises subjecting a mixture of alcohol and an aliphatic aldehyde having at least four carbon atoms to temperatures of 250°–460° C. in the presence of a dehydration catalyst to produce a mixture of erythrene and other products, and recovering the erythrene therefrom.

6. Method of manufacturing erythrene which comprises subjecting a mixture of alcohol and an aliphatic aldehyde having at least four carbon atoms to temperatures lying within the lower portion of the range of 250°–460° C. in the presence of a dehydration catalyst to produce a mixture of erythrene and other products, and converting the erythrene into a separable form.

7. Method of manufacturing erythrene which comprises subjecting a mixture of alcohol and an aliphatic aldehyde having at least four carbon atoms to temperatures of 250°–460° C. at atmospheric pressure in the presence of a dehydration catalyst to produce a mixture of erythrene and other products, converting the erythrene into a separable form, and recovering the erythrene.

8. Method of manufacturing erythrene which comprises decomposing a mixture of aldol in the presence of a dehydration catalyst at temperatures between 250°–460° C. to produce a vaporous mixture of erythrene and other products, and converting the erythrene into separable form.

9. Method of manufacturing erythrene which comprises decomposing a mixture of aldol in the presence of a dehydration catalyst at temperatures between 250°–460° C. to produce a vaporous mixture of erythrene and other products, converting the erythrene into separable form, and freeing said erythrene of other reaction products.

10. Method of manufacturing erythrene which comprises decomposing aldol in the presence of alcohol at temperatures lying between 250–460° C., cooling and condensing the vaporous reaction products, and converting the erythrene therein into separable form.

11. Method of manufacturing erythrene which comprises passing a mixture of aldol and alcohol over aluminum hydroxide at 250–460° C. to produce a vaporous mixture of erythrene and other products, converting the erythrene into separable form, and recovering it from the mixture.

12. Method of manufacturing erythrene which comprises passing a mixture of aldol and alcohol over aluminum hydroxide at 250–460° C. to produce a vaporous mixture of erythrene and other products, cooling and condensing said products, and recovering erythrene therefrom.

13. Method of manufacturing erythrene which comprises passing a mixture of aldol, alcohol and water over aluminum hydroxide at temperatures lying between 250°–460° C. to produce a gaseous mixture of erythrene and other products, cooling and condensing the products, and separating erythrene therefrom.

14. Method of manufacturing erythrene which comprises passing a mixture of aldol, alcohol and water over aluminum hydroxide at temperatures of approximately 300° C. to produce a gaseous mixture of erythrene and other products, cooling and condensing the products, and separating erythrene therefrom.

15. Method of manufacturing erythrene which comprises heating a mixture of aldol, ethyl alcohol and water to approximately 300° C., cooling and drying the gaseous reaction products, condensing the gases to remove unchanged alcohol and aldol, again cooling to convert the erythrene into separable form.

16. Method of manufacturing erythrene which comprises heating a mixture containing equi-molecular portions of aldol and ethyl alcohol to approximately 300° C. in the presence of aluminum hydroxide and moisture, cooling and drying the gaseous reaction products, passing said products into bromine, and recovering erythrene tetra bromide therefrom.

17. Method of manufacturing erythrene which comprises heating a mixture of aldol, ethyl alcohol and water to approximately 300° C., cooling and drying the gaseous reaction products, collecting them in bromine, separating erythrene tetra bromide from the other reaction products, and converting said bromide into erythrene.

18. A method of manufacturing erythrene which comprises heating a mixture containing aldol, alcohol and a diluent to 250°-460° C. in the presence of aluminum hydroxide to form a reaction mixture containing erythrene, and converting the erythrene into separable form.

19. In a process for preparing erythrene from aldol by heat decomposition in the presence of a catalyst, the method of minimizing resinification of the aldol which comprises carrying on said heat decomposition in the presence of water vapor.

Signed at New York, county and State of New York, this 14th day of September, 1926.

ALEXANDER T. MAXIMOFF.